July 4, 1967
R. K. SHANNON ETAL
3,329,801
OPHTHALMIC FRAME WARMER
Filed June 22, 1964
3 Sheets-Sheet 1
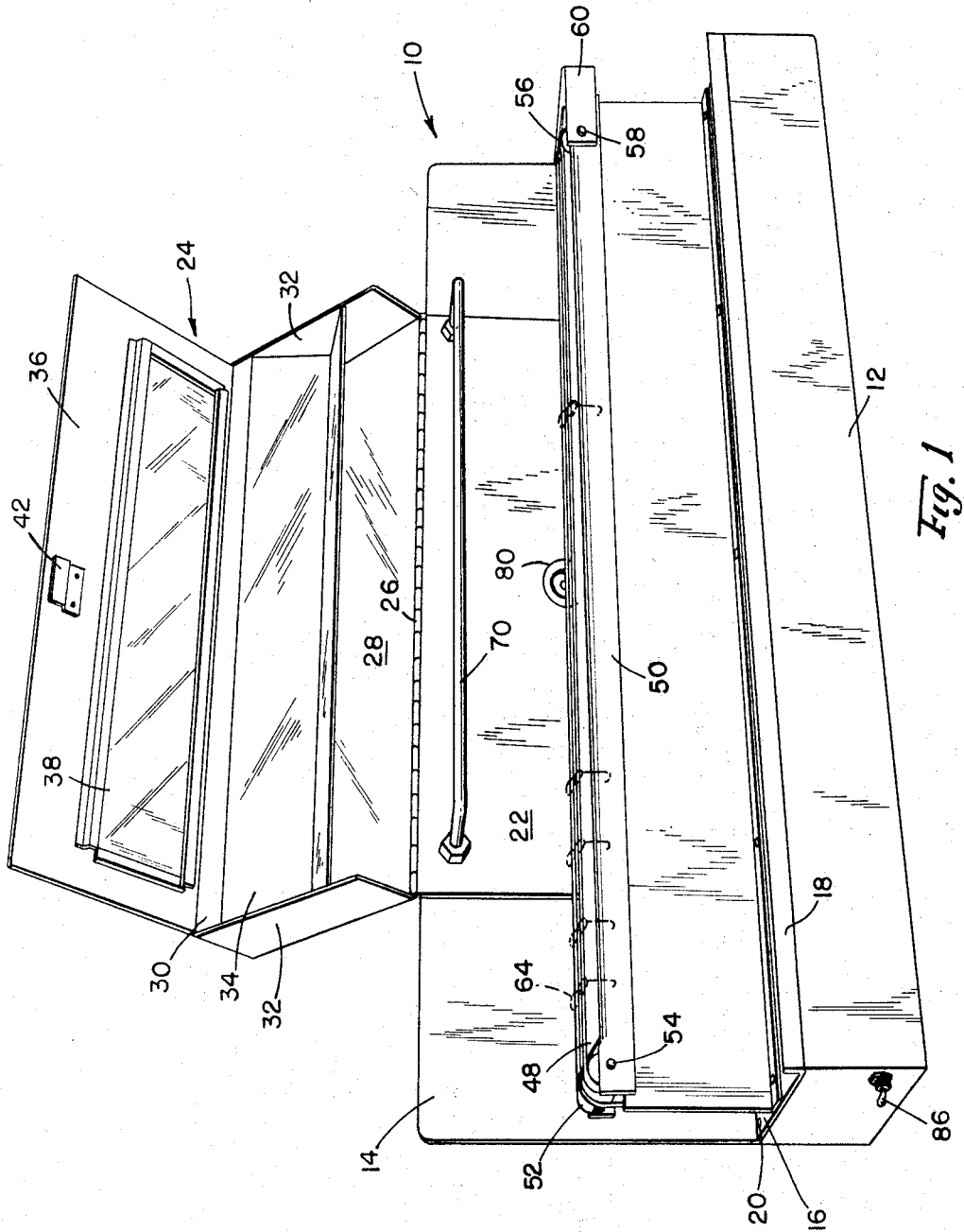
Fig.1
INVENTORS
ROBERT K. SHANNON
CLYDE D. DAMRON
ATTORNEY

INVENTOR
ROBERT K. SHANNON
CLYDE D. DAMRON
BY
ATTORNEY

July 4, 1967  R. K. SHANNON ETAL  3,329,801
OPHTHALMIC FRAME WARMER
Filed June 22, 1964  3 Sheets-Sheet 3
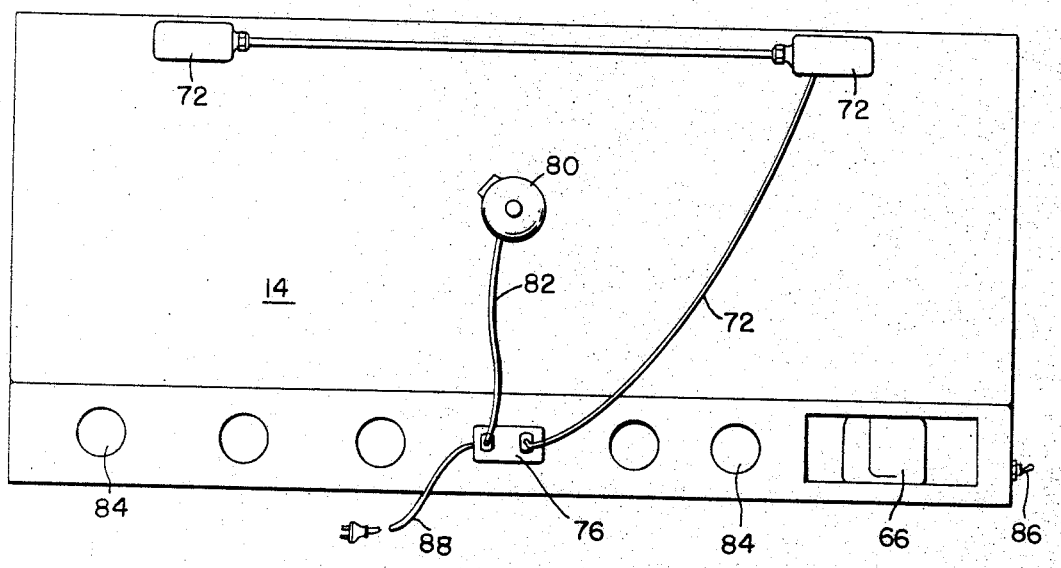
Fig. 4
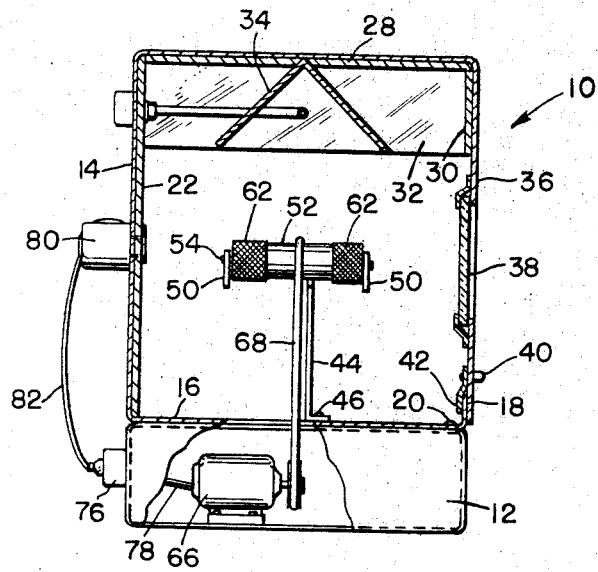
Fig. 5
INVENTOR
ROBERT K. SHANNON
CLYDE D. DAMRON
ATTORNEY 3,329,801
OPHTHALMIC FRAME WARMER
Robert K. Shannon, 6444 N. Invergordon Road, Scottsdale, Ariz. 85251, and Clyde D. Damron, 6210 Calle Redonda, Phoenix, Ariz. 85018
Filed June 22, 1964, Ser. No. 376,907
10 Claims. (Cl. 219—388)

This invention relates to a heating device and more particularly it relates to a warmer for heating ophthalmic plastic frames prior to the insertion of lenses thereinto.

Since corrective eyeglass lenses are individually manufactured and ground, such lenses are provided as separate items which must be introduced into the desired ophthalmic or eyeglass frames. When the frame are fabricated of plastic, as is customary with most frames currently available, some means must be provided to heat the frames in order to soften the plastic to permit insertion of the lenses. In the past, such means has taken the form of a bath of hot salt or glass beads into which the frames are immersed or of a radiant heater such as a forced hot air blower or an infra-red heating lamp which radiates heat onto the frames.

While all of these prior forms of heating means have been able to produce some softening of the frame plastic to permit insertion of the lenses, none has been completely satisfactory. The main drawback with all of these prior heating techniques was that time of heating was not controlled and hence the amount of heat received was not uniform. With one set of frames, the heating time would be too short and the frames would not be properly softened whereas with the next set of frames the heating time could be too long and the frames would be too soft and pliable. Such non-uniform heat application also had a tendency to distort the frames and thus prevent proper fitting of the lenses and thus also detracted from the appearance of the finished glasses.

Another drawback with prior heating techniques was that were time consuming, both in waiting for the bath or the radiant heater to warm up and then in holding the frames while heating was effected. Still a further drawback, at least insofar as immersion bath heaters were concerned, was the fact that the salt and the glass beads could mar the surface finish of the frames as well as loosen beads or stones inset in the frames for decorative purposes. Also such salt or beads often became entrapped between the lenses and the frames.

It is, therefore, an object of the invention to overcome the shortcomings of prior art heating techniques and to provide an ophthalmic frame warmer which uniformly heats plastic frames prior to insertion of the lenses.

Another object of the invention is to provide an ophthalmic frame heating technique which will not mar or unduly distort the frames and will thus not detract from their final appearance.

Another object of the invention is the provision of a heating technique for conditioning plastic frames, wherein the technique can be quickly and easily carried out by a normally skilled operator.

Further objects of the present invention include the provision of an opthalmic frame warmer which can be inexpensively manufactured, which has a minimum of parts, which can be easily operated, which can warm multiple frames in a short time, and which will give extended service with a minimum of maintenance.

Other and further objects and advantages and salient features of the invention will become apparent from the following detailed description, which, taken in conjunction with the annexed drawings, discloses a preferred embodiment thereof.

Referring to the drawings:

FIGURE 1 is a perspective view of an opthalmic frame warmer in accordance with the principles of the present invention;

FIGURE 4 is a rear elevational view thereof; and

FIGURE 5 is a sectional view thereof taken substantially along line 5—5 of FIGURE 2.

Figure 2:
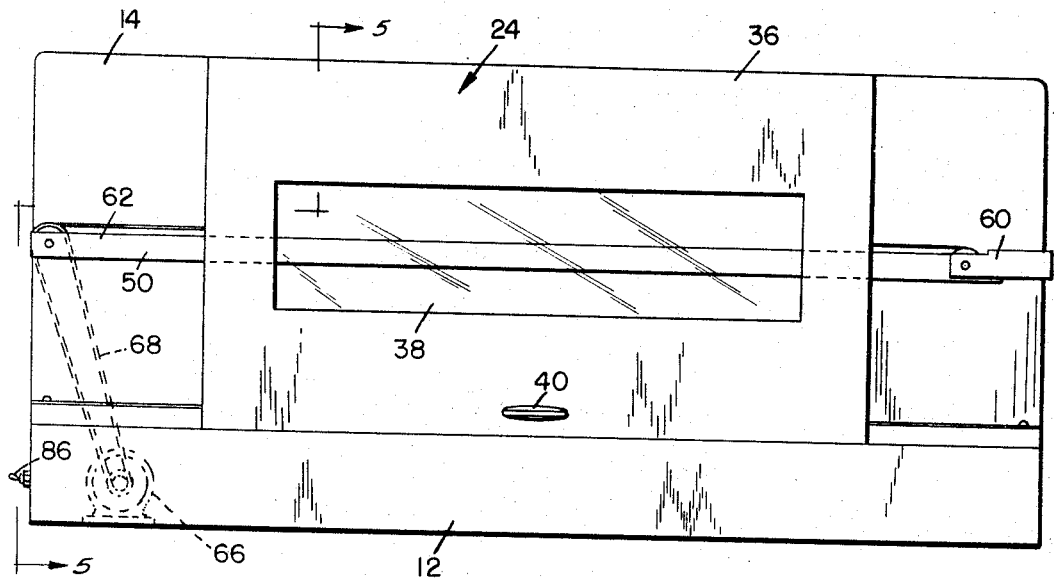
FIGURE 2 is a front elevational view thereof.

As can be seen in FIGURE 1, the ophthalmic frame warmer is generally designated 10 and is supported upon an elongated hollow base portion 12 designed to rest upon a bench, a table or the floor. An upstanding rear wall 14 projects above the base portion along the length thereof, with the rear wall having an integral base wall 16 extending therefrom across the base portion 12 and terminating in an upturned lip 18. Suitable fastening means 20, such as rivets or bolts, affix the base wall 16 to the base portion 12. An auxiliary rear wall 22 having a height equal to the wall 14, but having a lesser lateral extent, is disposed centrally of the rear wall and is suitably secured thereto.

A swingable cover generally designated 24 is pivotally mounted on the auxiliary rear wall 22 by an elongated continuous piano type hinge 26 which is secured between that wall and the top wall 28 of the cover 24. Depending from top wall 28 is a short front wall 30 and short side walls 32 within which an inverted V-shaped reflector 34 is mounted. As can be seen from FIGURES 1 and 5, the reflector 34 extends fully between the side walls 32 and has its apex mounted within the top wall 28. A longer front wall 36 of the cover 24 is secured to and extends beyond the short front wall 30 and, if desired, may also have an integral portion which extends across the top wall 28. A heat resistant elongated glass or quartz window 38 is disposed substantially centrally of the front wall 36 to facilitate visual observation during heating of the frames. A handle 40 is attached to the outside of the wall 36 and aligned with the handle, but on the inside of the wall 36 is a hooked bracket 42. By manually grasping and moving the handle 40, the cover 24 can be pivoted about the hinge 26 between an open position, as shown in FIGURE 1, and a closed position, as shown in FIGURES 2 and 5, wherein the hooked bracket 42 overlies the upturned lip 18.

To provide a support for the frame conveying means, an upstanding angle plate 44 is disposed along the base wall 16 and is secured thereto by suitable fastening means, such as bolts 46 extending through its angled leg. A cross plate 48 extends perpendicularly across the top of the angle plate 44 and a pair of said spaced side rails 50 depend from this cross plate. At one end of the support, a spool 52 is rotatably mounted between the rails 50 by means of a central pin 54 which passes through the spool and is journaled within the rails. A similar spool 56 is mounted at the other end of the support by a central pin 58 and a bifurcated bracket 60 is mounted adjacent the spool 56 by having its legs pivotally secured to the ends of the pin 58 which project beyond the rails 50.

Figure 3:
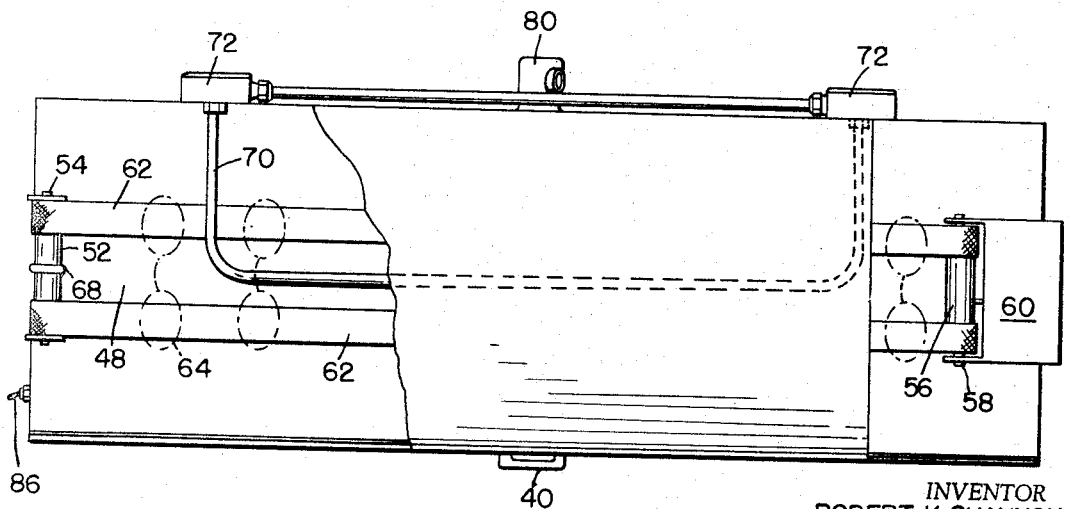
FIGURE 3 is a top plan view thereof.

A pair of endless belts 62 extend between the spools 52 and 56 at the outer edges thereof, as shown in FIGURE 3. The belt surfaces may be knurled or roughened, if desired, to prevent slippage of the frames thereon. As shown in FIGURES 1 and 3, the ophthalmic frames 64 can be placed across the belts 62 with their bows projecting downward beside the rails 50. To convey the frames 64, the belts 62 are driven by means of an electric motor 66 mounted within the base portion 12 as shown in FIGURE 5. A belt drive 68 extends between the motor 66 and the medial portion of the spool 52 whereby operation of the motor causes a responsive rotation of the spool 52. As the spool 52 is rotated, it drives the endless belts 62 in a direction which feeds the frames 64 toward the spool 56. When the frames reach the spool 56, they leave the belts 62 and are deposited upon the bracket 60 for subsequent installation of the lenses. The belts 62 are disposed at a suitable height so that the frames 64 travelling thereon may be visually observed through the window 38 when the cover 24 is lowered.

A radiant heater in the form of a calrod or electrically heated rod 70 is disposed above the belts 62 to radiate heat which warms the frames 64 travelling along with the belts. The calrod 70 is mounted through the rear walls 14 and 22 and extends into a pair of spaced interconnected conventional terminal boxes 72 mounted on the rear of the wall 14, as shown in FIGURES 3 and 4. A plugged cord 74 extends from one switch box 72 to a conventional junction box 76 which receives power by being plugged into a conventional wall outlet unit. The motor 66 can also be driven from the junction box 76 by means of a lead 78 extending therebetween as shown in FIGURE 5.

A conventional exhaust fan 80 is provided with its front or inlet end disposed centrally within the auxiliary rear wall 22 and its rear housing or discharge end projecting rearwardly of the wall 14. A plugged cord 82 connects the fan 80 to the junction box 76, as shown in FIGURE 4. When the fan 80 is operated, it serves to withdraw the heated air from the warmer 10 and discharge it through the rear end thereof. A plurality of spaced ventilating openings 84 are provided at the rear of the base portion 12, as shown in FIGURE 4, to permit warm air to escape from the interior thereof and not accumulate therein. A master switch 86 is provided at one end of the base portion 12 and is connected to the motor 66 to control its operation and hence to control the movement of the endless belts 62.

The warmer 10 is put into operation by installing a plugged lead or wire 88 into a conventional wall outlet unit, preferably of the 110 volt type. The lead 88 energizes the junction box 76 and thus supplies electrical energy to both the calrod 70 and the exhaust fan 80. The cover 24 is swung from its open position, as shown in FIGURE 1, to its closed position, as shown in FIGURES 2, 3 and 5. When the cover is closed, the reflector 34 overlies the heated calrod 70 and reflects its radiated heat downwardly toward the endless belts 62. After a brief warm-up period during which the heat in the warmer 10 is allowed to build up to its proper level, the frames 64 may then be fed along the belts. If the belts 62 are not already moving, the switch 86 is turned on to initiate such movement. When the belts 62 are moving, each pair of frames 64 is placed upon the belts at the end adjacent the spool 52. The frames 64 feed along on the belts 62 and travel under the closed cover 24 beneath which the radiated heat from the calrod 70 is reflected downwardly by the reflector 34 to heat and soften the plastic of the frames. The exhaust fan 80 withdraws the already heated air to prevent it from accumulating beneath the cover and subjecting the frames 64 to too high a temperature. Instead, the frames are conveyed through a zone of controlled and uniform radiant heat which is maintained beneath the cover 24. As the heated frames emerge from the end of the cover 24, they feed onto the bracket 60 whereat the lenses can be introduced easily into the now softened frame portions surrounding the lens openings. If a frame 64 is formed of extremely heavy plastic which requires a prolonged heating time, the switch 86 may be turned off as the frame is beneath the cover 24 and the frame will therefore remain thereunder, being heated, until the switch 86 is again turned on to convey the frame out from beneath the cover. As the frames 64 are heated beneath the cover, they can be visually observed through the window 38.

While but one form of the invention has been shown and described herein, it will be readily apparent to those skilled in the art that many minor modifications may be made without departing from the spirit of the invention or the scope of the appended claims.

What is claimed is:

1. An ophthalmic frame warmer comprising:
   an endless conveying means which accommodates ophthalmic frames to be heated;
   a radiant heater disposed above at least a portion of said endless conveying means;
   a reflector disposed above said radiant heater and operative to reflect the radiated heat from said heater downward toward said endless conveying means to warm the ophthalmic frames travelling thereon;
   forced convection means cooperating with said conveying means to warm an ophthalmic frame to a desired temperature; and
   electrical means comprising circuit means for selectively energizing said endless conveying means, said radiant heater and said forced convection means.

2. An ophthalmic frame warmer as defined in claim 1 wherein said radiant heater is an electrically heated rod.

3. An ophthalmic frame warmer as defined in claim 1 wherein said reflector is mounted on the underside of a swingable cover.

4. An ophthalmic frame warmer as defined in claim 3 but further characterized by an exhaust fan mounted beneath said cover to prevent the heat from accumulating thereunder.

5. An ophthalmic frame warmer as defined in claim 3 wherein said cover is provided wtih a window which permits visual observation of the ophthalmic frames on said endless conveying means while said cover is closed.

6. An ophthalmic frame warmer as defined in claim 1 but further characterized by an electric motor for driving said endless conveying means.

7. An ophthalmic frame warmer comprising:
   a base portion;
   a back wall projecting above said base portion;
   a cover hingedly connected to said back wall for pivotal movement relative thereto;
   said cover having a top wall extending substantially parallel to said base portion when said cover is closed and a front wall extending substantially parallel to said back wall when said cover is closed;
   said front wall having a window mounted centrally therein;
   a generally V-shaped reflector attached to said cover with the apex of said V-shape being attached to said top wall and the open end thereof extending downward toward said base portion when said cover is closed;
   an upstanding support member mounted upon said base portion and extending upwardly therefrom in spaced alignment beneath said reflector;
   rotatably mounted spools disposed at opposite upper ends of said support member;
   endless belt means extending between and around said spools;
   electric motor means connected to said endless belt means for driving said belt means and causing it to move in a linear manner to transport ophthalmic frames from one spool toward the other;

a radiant heater mounted in said back wall and extending between said reflector and said endless belts; and
an exhaust fan mounted in said back wall beneath said cover to prevent heated air from accumulating thereunder;
said ophthalmic frames being mountable upon said endless belt means to be conveyed beneath said cover whereat the warm air from said radiant heater is reflected toward said frames by said reflector, as can be visually observed through said window.

8. An ophthalmic frame warmer as defined in claim 7 wherein said radiant heater is an electrically heated rod.

9. An ophthalmic frame warmer as defined in claim 8 wherein said electric motor means is controlled by a manual switch.

10. An ophthalmic frame warmer as defined in claim 9 wherein said radiant heater, said exhaust fan and said electric motor means are all electrically energized from the same power source.

References Cited
UNITED STATES PATENTS

| | | | |
|---|---|---|---|
| 2,125,912 | 8/1938 | George et al. | 219—388 X |
| 3,239,651 | 3/1966 | Silberman | 219—388 |

FOREIGN PATENTS

| | | |
|---|---|---|
| 94,554 | 5/1923 | Austria. |

RICHARD M. WOOD, *Primary Examiner.*

R. F. STAUBLY, *Assistant Examiner.*